J. Richard,
Fence.
No. 88,412.  Patented Mar. 30, 1869.
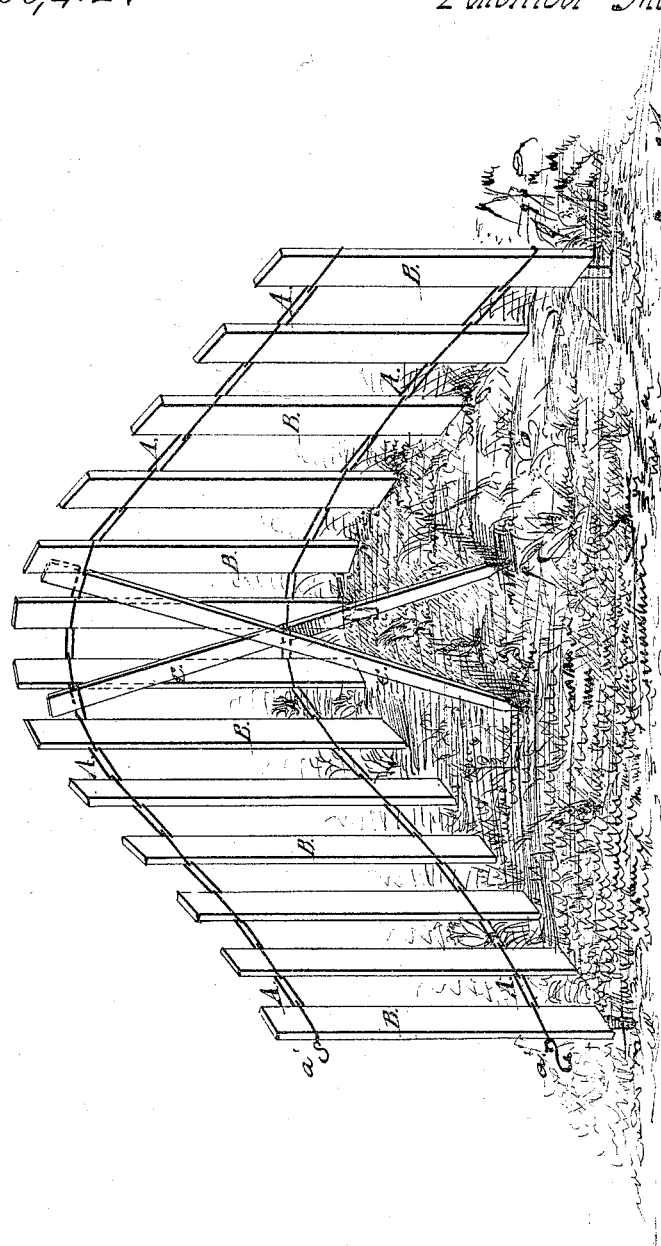
Witnesses:
Inventor:
Joseph Richard

JOSEPH RICHARD, OF COLUMBIAVILLE, MICHIGAN.

Letters Patent No. 88,412, dated March 30, 1869.

IMPROVEMENT IN FENCE.

The Schedule referred to in these Letters Patent and making part of the same

*To all whom it may concern:*

Be it known that I, JOSEPH RICHARD, of Columbiaville, in the county of Lapeer, and State of Michigan, have invented a new and useful Improvement in Portable Fence; and I do hereby declare that the following is a full, clear, and exact description thereof, which will enable others skilled in the art to make and use the same, reference being had to the accompanying drawing, forming part of this specification, in which the figure represents a portion of my improved fence.

My invention has for its object to furnish an improved portable fence, which shall be simple in construction, strong, durable, easily put up, taken down, or moved from place to place, and which can be easily and readily repaired when required; and It consists in the fence constructed in the manner hereinafter more fully described.

A are the wire chains, formed of welded links, so as to give it strength.

The size of the wire of which the links are formed, depends upon the required strength of the fence, and the greater or less amount of money the builder is willing to expend in said fence.

B are pickets, which are passed through the links of the chains A, as shown in the figure.

The pickets B may be of any desired shape or size, and may be made of sound or unsound timber, as may be convenient.

Some of the pickets B, at suitable distances apart, are made long, so as to be driven into the ground, to hold the fence in an erect position.

The fence, at its angles, is supported and braced by stakes, C, passed through the links of the chain A, upon each side of the corner-picket, and driven into the ground in such a position as to cross each other, as shown in the figure.

The fence may also be strengthened, at points where it may require it, by stakes, passed through the links of the chains and driven into the ground; or the same thing may be accomplished by increasing the number of long, or stake-pickets, at such points as require greater strength.

In moving the fence from place to place, it may be taken down and rolled into bundles. For convenience in doing this, hooks, $a'$, may be formed in the chains A, at suitable distances apart, so as to divide up the fence into suitable lengths.

In building the fence, the chains and pickets may be taken to the field separately, and put together in the place where the fence is to be erected.

Having thus described my invention,

I claim as new, and desire to secure by Letters Patent—

1. An improved portable fence, formed by the combination of the pickets B and chains A with each other, substantially in the manner herein shown and described, a suitable number of said pickets being made long, to be driven into the ground, as and for the purpose set forth.

2. Strengthening the fence A B, at its angles or other parts, by brace and supporting-stakes C, substantially as herein described and set forth.

JOSEPH RICHARD.

Witnesses:
ALFRED PETIT,
JOHN E. DEMING.